(12) United States Patent
Shimizu et al.

(10) Patent No.: US 9,007,722 B2
(45) Date of Patent: Apr. 14, 2015

(54) HIGH FREQUENCY MAGNETIC FIELD ASSISTED MAGNETIC RECORDING HEAD

(71) Applicant: Hitachi, Ltd., Tokyo (JP)

(72) Inventors: Junichiro Shimizu, Fujisawa (JP); Kikuo Kusukawa, Yoshikawa (JP); Yo Sato, Odawara (JP); Masukazu Igarashi, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/968,720

(22) Filed: Aug. 16, 2013

(65) Prior Publication Data
US 2014/0063658 A1   Mar. 6, 2014

(30) Foreign Application Priority Data
Aug. 30, 2012   (JP) ................ 2012-190336

(51) Int. Cl.
| | | |
|---|---|---|
| G11B 5/127 | (2006.01) | |
| G11B 5/23 | (2006.01) | |
| G11B 5/35 | (2006.01) | |
| G11B 5/84 | (2006.01) | |
| G11B 5/31 | (2006.01) | |
| G11B 5/00 | (2006.01) | |

(52) U.S. Cl.
CPC .. *G11B 5/35* (2013.01); *G11B 5/84* (2013.01); *G11B 5/1278* (2013.01); *G11B 5/314* (2013.01); *G11B 2005/0024* (2013.01)

(58) Field of Classification Search
USPC ............... 360/125.3, 119.01, 119.02, 119.03, 360/119.04, 122, 125.03
See application file for complete search history.

(56) References Cited

U.S. PATENT DOCUMENTS

| | | | |
|---|---|---|---|
| 8,472,135 B1* | 6/2013 | Kusukawa et al. | 360/110 |
| 8,687,322 B1* | 4/2014 | Matsumoto et al. | 360/125.3 |
| 2012/0147502 A1* | 6/2012 | Udo et al. | 360/125.12 |
| 2012/0275061 A1* | 11/2012 | Takagishi et al. | 360/123.05 |
| 2012/0320474 A1* | 12/2012 | Soeno et al. | 360/319 |
| 2013/0329316 A1* | 12/2013 | Watanabe et al. | 360/78.04 |
| 2014/0078618 A1* | 3/2014 | Matsumoto et al. | 360/99.08 |
| 2014/0177100 A1* | 6/2014 | Sugiyama et al. | 360/125.03 |
| 2014/0177105 A1* | 6/2014 | Shiimoto et al. | 360/244 |

OTHER PUBLICATIONS

Jian-Gang Zhu et al., Microwave Assisted Magnetic Recording, IEEE Transactions on Magnetics, Jan. 2008, pp. 125-131, vol. 44, No. 1.

* cited by examiner

*Primary Examiner* — Jefferson Evans
(74) *Attorney, Agent, or Firm* — Baker Botts L.L.P.

(57) ABSTRACT

To uniformly determine the positional relationship between a main magnetic pole and a spin torque oscillator while independently optimizing the main magnetic pole and the spin torque oscillator. On a trailing end surface of a main magnetic pole, a step is provided at the boundary between the main magnetic pole and a gap material disposed on both sides thereof, and a spin torque oscillator is formed on the step. The spin torque oscillator is effectively separated into two regions by utilizing the step. Further, a part of the spin torque oscillator is removed so as to disable the unwanted region, thereby realizing a self-alignment type high frequency magnetic field assisted magnetic recording head structure such that the positions of the end portions of the main magnetic pole and the spin torque oscillator are aligned.

7 Claims, 9 Drawing Sheets

HIGH FREQUENCY MAGNETIC FIELD ASSISTED MAGNETIC RECORDING HEAD

CLAIM OF PRIORITY

The present application claims priority from Japanese patent application JP 2012-190336 filed on Aug. 30, 2012, the content of which is hereby incorporated by reference into this application.

TECHNICAL FIELD

The present invention relates to a high frequency magnetic field assisted magnetic recording head that assists magnetic recording with a high frequency magnetic field, and a method for manufacturing the same.

BACKGROUND ART

Magnetic disk units mounted on computers and the like as an information recording apparatus are required to have higher recording densities so as to store vast amounts of information without increasing the size of the apparatus. In order to increase the recording density of magnetic disks, a high-coercivity recording medium is used to meet the demand for stabilizing the very small recording bits. To record a high-coercivity recording medium, it is necessary to focus a strong recording field in a very small region. However, as the recording density is increased, it becomes technically difficult to focus a strong recording field in a very small region.

As a technology to overcome this problem, energy assisted recording technology that assists recording by adding separate energy to the recording field is regarded as a likely candidate. As the energy used for assisting, heat and high frequency magnetic field are currently considered more practically promising.

The energy assisted recording using heat is referred to as "thermally assisted magnetic recording" or "optically assisted recording". At the time of recording, the recording medium (ferromagnetic material) is irradiated with light simultaneously with magnetic field application, thus heating the medium to temperatures near the Curie temperature of the recording medium (approximately several hundred degrees Celsius) and reducing its coercivity. In this way, recording of a high-coercivity recording medium for which recording has been difficult with the conventional magnetic recording head due to a lack of recording field strength can be facilitated. For reproduction, a magnetoresistive effect element that is used in conventional magnetic recording is used.

In the thermally assisted magnetic recording system, laser light for heating the medium is guided to the recording head. As a laser light source, a small-size and small-power-consumption semiconductor laser diode is used due to the need for use within the magnetic disk apparatus package.

On the other hand, the energy assisted recording that employs a high frequency magnetic field as the energy is referred to as "high frequency magnetic field assisted recording" or "microwave assisted recording". The recording medium is irradiated with a high frequency magnetic field separately from the recording field to make the magnetization of the recording medium resonate and easier to move, thus facilitating the recording of the high-coercivity recording medium for which recording has been difficult due to the lack of recording field strength. For reading, a magnetoresistive effect element that is used in conventional magnetic recording is used, as in thermally assisted recording.

In the high frequency magnetic field assisted recording, an element that generates the high frequency magnetic field is disposed in the vicinity of the recording magnetic pole. This element is referred to as a "spin torque oscillator (STO)". The STO is disposed between a main magnetic pole and a trailing shield, or between the main magnetic pole and a wire for driving the STO. A high frequency magnetic field assisted recording head in which the STO is disposed in the vicinity of the recording magnetic pole is disclosed in Non-patent Document 1, for example. The STO has a magnetic-film stacked structure similar to a read sensor such as GMR or TMR used in the head of a magnetic disk apparatus, and has the feature that it can be easily integrally formed with a conventional magnetic head.

PRIOR ART DOCUMENT

Non-patent Document 1: J. Zhu, et al., "Microwave assisted magnetic recording", IEEE Transactions on Magnetics, Vol. 44 (2008), pp. 125-131

SUMMARY OF THE INVENTION

Problem to be Solved by the Invention

The high frequency magnetic field generated by the STO unstably moves the magnetization of the high-coercivity recording medium for which recording with the recording field generated by the main magnetic pole alone cannot be performed, thereby making it easier for the magnetization to be reversed and facilitating magnetic recording. Thus, the magnetic field generated by the main magnetic pole and the high frequency magnetic field generated by the STO need to be superimposed, and to efficiently obtain the assist effect, it is desirable to position the STO and the main magnetic pole as much close to each other as possible. Accordingly, it is desirable to form the STO as close as possible to a trailing side end portion where the main magnetic pole generates a strong recording field. Thus, a structure in which the STO is formed in proximity to the main magnetic pole between the main magnetic pole and the trailing shield is the basic structure of the recording head portion of a high frequency magnetic field assisted recording head.

While the above structure with the main magnetic pole and the STO close to each other may be appropriate in the bit direction (which may also be referred to as "on-track direction"), it is also necessary to accurately position the main magnetic pole and the STO in a perpendicular direction, i.e., a cross-track direction. The bits as the units of recording in the magnetic disk are longer in the cross-track direction. Thus, if the positions of the main magnetic pole and the STO are displaced from predetermined positions in the cross-track direction, sufficient assisting cannot be performed with the high frequency magnetic field from the STO. Even if the assist effect is obtained, assist effect variations may be caused if the main magnetic pole and the STO are not uniformly positioned for each magnetic head but displaced. Thus, a structure such that a uniform positional relationship between the main magnetic pole and the STO in the cross-track direction can be maintained and characteristics variations due to a position error are not caused is required.

According to a conventional recording system, while it is desired to have the center of the main magnetic pole and the center of the STO aligned with each other, it is difficult to achieve their complete alignment because the main magnetic pole and the STO are formed by separate lithography and etching processes, where the positioning accuracy is determined by the accuracy of lithography. The positional misalignment decreases the high frequency magnetic field assist effect, and the positional variations are a main cause of variations in the assist characteristics by the STO. According to a shingled magnetic recording system, the STO is disposed with its center offset from the center of the main magnetic pole in the cross-track direction by a certain amount. When shingled magnetic recording is performed in high frequency magnetic field assisted recording, an assist effect at the end portion of the main magnetic pole is required, and it is desirable to have a uniform positional relationship between the end portions of the main magnetic pole and the STO.

As a method for preventing the position error between the main magnetic pole and the STO, the main magnetic pole and the STO may be etched in one batch. However, in the method by which the main magnetic pole and the STO are etched in one batch, the main magnetic pole and the STO need to have substantially the same width. It also becomes significantly difficult to set the angle of the side surface of the main magnetic pole and the angle of the side surface of the STO individually, or to form separate shapes in the depth direction from the air bearing surface. Namely, design freedom in optimizing the characteristics of the main magnetic pole and the STO is lost. As a result, it becomes difficult to manufacture a high frequency magnetic field assisted recording head that can provide high performance.

The present invention provides a structure such that, in a high frequency magnetic field assisted magnetic recording head, the positional relationship between a main magnetic pole and an STO in the cross-track direction can be accurately determined and variations in high frequency magnetic field assist characteristics are not caused, and a method for manufacturing the same.

Means for Solving the Problem

A high frequency magnetic field assisted magnetic recording head according to the present invention includes a main magnetic pole that generates a recording field, and a spin torque oscillator disposed in the vicinity of the main magnetic pole. A magnetic shield or a wire for supplying electric power to the spin torque oscillator is disposed in contact with a surface of the spin torque oscillator on the opposite side from a surface on the main magnetic pole side. A step is formed at a boundary position between the main magnetic pole and a gap material disposed on both sides of the main magnetic pole, or between the gap material and a side shield contacting the gap material on trailing side surfaces thereof in at least an air bearing surface. The spin torque oscillator is formed on the step in at least the air bearing surface. A part of the spin torque oscillator is removed in a film thickness direction in a region on one side of the step at the boundary.

A high frequency magnetic field assisted magnetic recording head according to the present invention includes a main magnetic pole that generates a recording field, and a spin torque oscillator disposed in the vicinity of the main magnetic pole. The spin torque oscillator is disposed in contact with the main magnetic pole, with a magnetic shield or a wire for supplying electric power to the spin torque oscillator disposed in contact with a surface of the spin torque oscillator on the opposite side from a surface thereof contacting the main magnetic pole. An end surface of a gap material disposed on both sides of the main magnetic pole protrudes beyond an end surface of the main magnetic pole toward a trailing side, forming a step between the main magnetic pole and the gap material on trailing side surfaces thereof in at least the air bearing surface. The spin torque oscillator is formed in contact with the inside of the gap material disposed on both sides of the main magnetic pole. The gap material is composed of an electric insulator.

A method for manufacturing a high frequency magnetic field assisted magnetic recording head according to the present invention includes the steps of: forming a side gap on both sides of a main magnetic pole and forming a side shield on the outside of the side gap; forming a step at a boundary between the main magnetic pole and the side gap and/or between the side gap and the side shield on trailing side surfaces thereof by performing etch back under a condition that the side gap and the main magnetic pole and/or the side shield have different etching rates; forming a layered film for a spin torque oscillator on the main magnetic pole, the side gap, and the side shield where the step is formed; forming an etching process mask covering at least one of the step; forming a spin torque oscillator positioned over the at least one step and having a step on an upper surface that conforms to the step on the lower surface by performing etching using the mask; and shaving a protruding portion of the spin torque oscillator having the step on the upper surface.

Effects of the Invention

According to the present invention, the positional relationship between the main magnetic pole and the STO in the cross-track direction can be accurately determined, and a structure for applying a stable high frequency magnetic field superimposed with a recording field can be realized. As a result, a magnetic recording head that provides a stable high frequency magnetic field assist effect can be realized, whereby an increase in recording density can be achieved.

Other problems, configurations, and effects will become apparent from the following description of embodiments.

MODE FOR CARRYING OUT THE INVENTION

In a wafer process in which a spin torque oscillator (STO) is formed at the end portion of a main magnetic pole on the trailing side, the main magnetic pole is formed and then the STO is formed thereon. Because the main magnetic pole and the STO are formed by separate lithography, position variations due to the accuracy of the respective lithography are caused in the cross-track direction. However, even when the apparent end portions of the main magnetic pole and the STO are not actually aligned, an effective self-alignment structure can be realized if the end portion of the main magnetic pole and the end portion where the STO effectively operates are aligned, whereby the positional relationship between the main magnetic pole and the STO can be uniquely determined. In order to realize such structure, the following method is adopted by the present invention.

Normally, for the main magnetic pole, a material having high saturation magnetic flux density, such as an alloy of iron and cobalt, is formed into an inverted trapezoidal or inverted triangular shape in the air bearing surface. The main magnetic pole is surrounded by a non-magnetic material as a gap material.

When the STO is formed, the surface of the main magnetic pole on the trailing side is planarized. At this time, the gap material positioned on the sides of the main magnetic pole and a side shield disposed on the sides of the gap material are also simultaneously planarized. Because the materials are different between the main magnetic pole and the gap material or the gap material and the side shield, a step can be intentionally produced at the boundary between the main magnetic pole and the gap material during a planarization process, such as CMP or ion milling, by utilizing etching rate differences. The STO formed on the step has an offset in the film thickness direction due to the step of the underlayer. Thus, by appropriately adjusting the size of the step, the exchange interaction between two regions across the step can be weakened inside the STO, whereby the STO can be effectively divided into the two regions.

Of the two regions, the STO is normally operated only on the side contacting the main magnetic pole. Because the end portion of the STO that is operated is automatically aligned with the end portion of the main magnetic pole, the structure is a self-alignment structure in which the end portions of the main magnetic pole and the STO are aligned without fail.

However, if the step is too small, the exchange interaction may not be sufficiently weakened and the STO may not be functionally divided. In that case, a part of one of the regions separated by the step that is not contacting the main magnetic pole may be removed in the film thickness direction so as to disable the region as an STO. An STO normally generates a high frequency magnetic field in a high frequency magnetic field generation layer with rotating magnetization. By removing a part or all of the high frequency magnetic field generation layer, the layer stops generating the high frequency magnetic field, so that the unwanted region can be prevented from operating as an STO. Specifically, after the STO film structure is stacked across the step, a part or all of the region of the STO that needs to be disabled can be removed by planarization, such as CMP or ion milling.

By accurately controlling the positional relationship between the main magnetic pole and the effectively operating STO by a method such as described above, a stable operation of the assist mechanism of the high frequency magnetic field assisted magnetic recording head can be realized.

In the following, embodiments of the present invention will be described with reference to the drawings.

Figure 1:
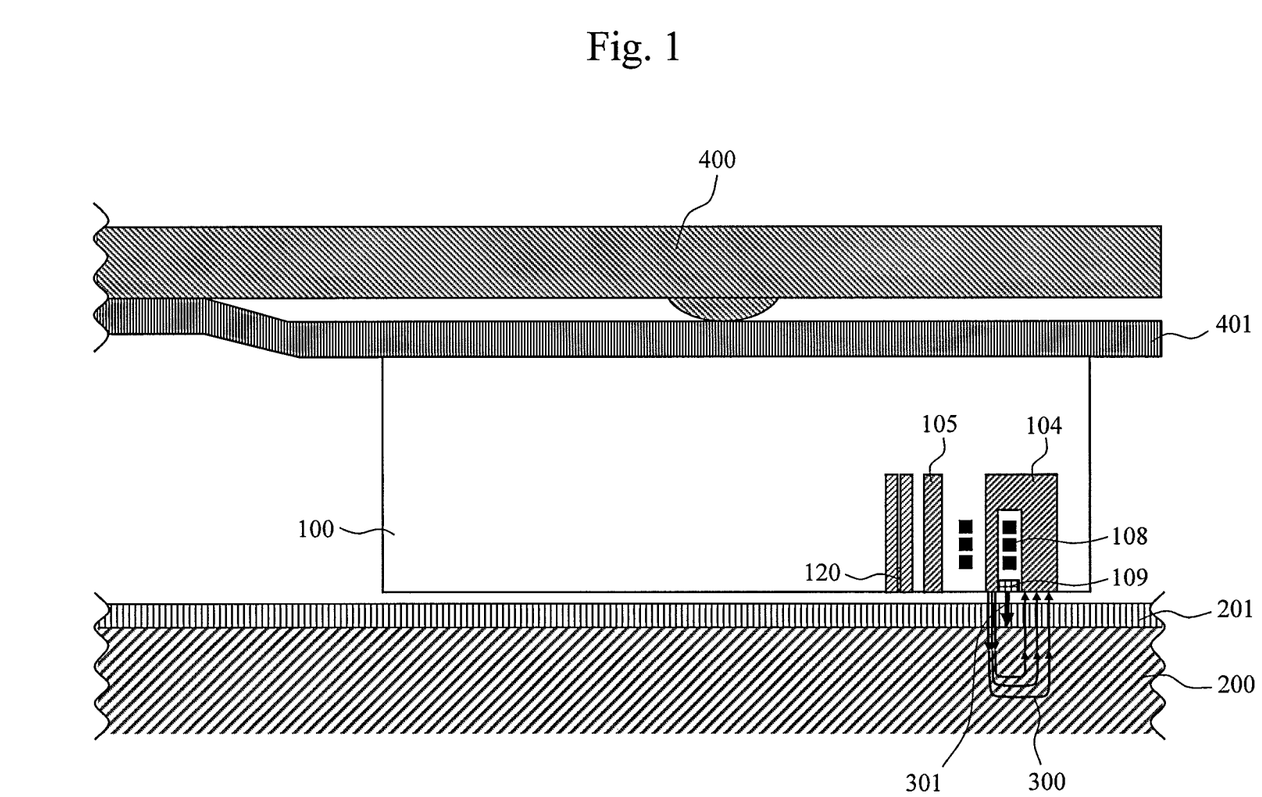
FIG. 1 is a schematic cross sectional view illustrating an embodiment of a slider provided with a high frequency magnetic field assisted magnetic recording head according to the present invention.
Figure 2:
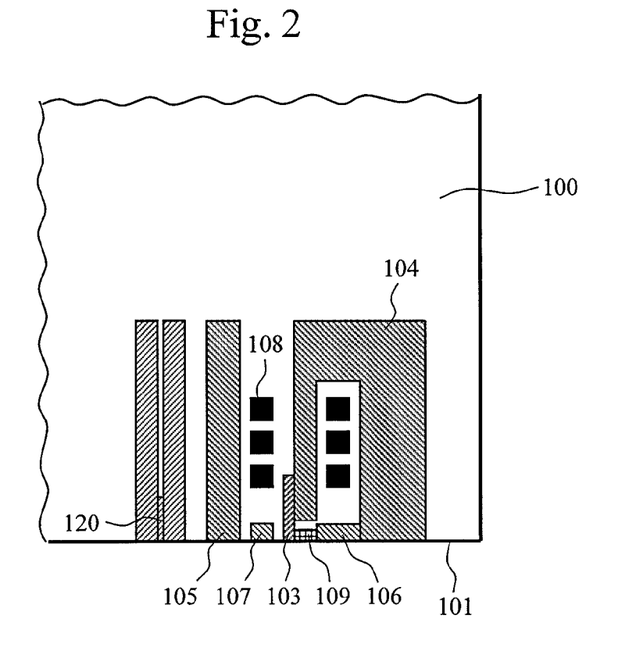
FIG. 2 is an enlarged schematic cross sectional view around magnetic poles.

FIG. 1 is a schematic cross sectional view illustrating an embodiment of a slider with a high frequency magnetic field assisted magnetic recording head according to the present invention. FIG. 2 is an enlarged schematic cross sectional view around magnetic poles of FIG. 1. As the internal structure of an actual slider is very complex, the drawings are simplified.

In a slider 100, the recording head is provided with a single-pole head including a main magnetic pole 103 and auxiliary magnetic poles 104 and 105; a magnetization coil 108 for magnetizing the single-pole head to cause the main magnetic pole 103 to generate a recording field 300; a trailing shield 106 and a leading-edge shield 107 for cutting the magnetic field from the main magnetic pole down to an appropriate size; and an STO 109 disposed in the vicinity of the main magnetic pole 103. The main magnetic pole 103, the auxiliary magnetic pole 104, and the trailing shield 106 also function as wires for supplying electric power to the STO 109.

The reproducing head is also provided with a magnetoresistive effect element 120 sandwiched between a pair of magnetic shields. The slider 100 is supported by a suspension 400 and a gimbal 401 and flies over the surface of the magnetic recording medium while maintaining a certain floating amount. While the illustrated magnetic recording medium has a structure such that a recording layer 201 is formed on a substrate 200, the magnetic recording medium may also be provided with an underlayer, an orientation control layer, a soft magnetic underlayer, and the like.

The STO 109 is an element that generates high frequency magnetic field based on a precession of magnetization caused by spin torque, and has a stacked structure including a high frequency magnetic field generation layer generating high frequency magnetic field and other layers. These layers form a structure combining a magnetic metal and a non-magnetic metal. The STO 109 normally has a cuboidal shape with a cross sectional dimension on the same order as the cross section of the main magnetic pole 103 on an air bearing surface (ABS) 101. As a DC electric current is supplied to the STO 109 from the main magnetic pole 103 toward the trailing shield 106 in the layered direction of the STO 109, precession is caused in the magnetization of the high frequency magnetic field generation layer, whereby a high frequency magnetic field is generated. A magnetic field 300 generated by the main magnetic pole 103 and a high frequency magnetic field 301 generated by the STO 109 are applied to the recording layer 201 of the magnetic recording medium.

Figure 3:
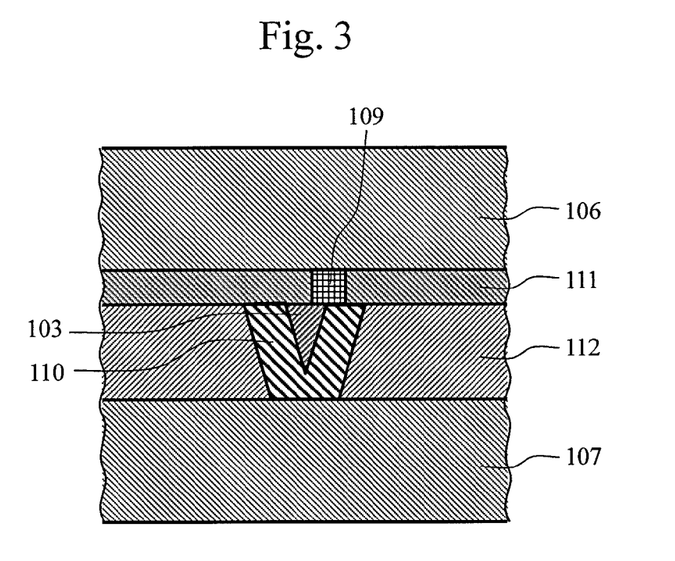
FIG. 3 is an enlarged schematic cross sectional view around the magnetic poles in an ABS of a high frequency magnetic field assisted magnetic recording head.

FIG. 3 illustrates a problem of the high frequency magnetic field assisted magnetic recording head provided with the STO, showing an enlarged schematic cross sectional view on the air bearing surface (ABS). Upper surfaces of the main magnetic pole 103 and the gap material 110 with inverted triangular shapes and the side shield 112 form a flat and flush plane on which the STO 109 is formed. The main magnetic pole and the shield material are magnetic materials, while the gap material is a non-magnetic material. Normally, the main magnetic pole 103 and the STO 109 are formed through separate lithography steps. Thus, no matter how accurate the lithography technology used is, it is difficult to position the main magnetic pole 103 and the STO 109 uniformly in the cross-track direction and with high reproducibility.

Figure 4:
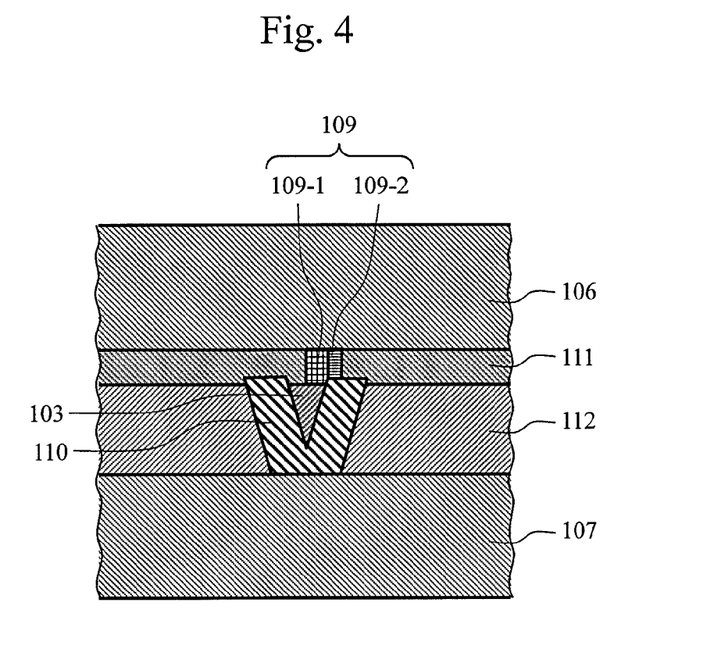
FIG. 4 is an enlarged schematic cross sectional view around the magnetic poles in the ABS of a high frequency magnetic field assisted magnetic recording head according to the present invention.

FIG. 4 is an enlarged schematic cross sectional view of a high frequency magnetic field assisted magnetic recording head according to the present invention on the air bearing surface (ABS). Upper surfaces of the main magnetic pole 103 and the gap material 110 do not form a flat and flush plane, but there is a step between the main magnetic pole 103 and the gap material 110. On the step, the STO 109 is formed.

The STO 109 is effectively divided into a region 109-1 and a region 109-2 at the step as a boundary. The region 109-2 has a smaller thickness than the region 109-1. Such a shape can be formed by removing the side of only the region 109-2 that is in contact with the trailing shield 106. Between the region 109-1 and the region 109-2, the layers of magnetic films forming the STO 109 are offset in the film thickness direction by the step, so that the exchange interaction between the respective regions is weakened. Further, because a part of the layers forming the STO is removed in the region 109-2, the STO operation can be disabled if the part of the layer is removed properly. Thus, the region 109-2 can be disabled as an STO, whereby only the region 109-1 can effectively operate as an STO. The location at which the region 109-1 and the region 109-2 are divided is aligned with the step between the main magnetic pole 103 and the STO 109 without fail. Thus, a self-alignment structure such that the end portion of the main magnetic pole 103 is aligned with the end portion of the region 109-1 functioning as the STO without fail is obtained. The greater the step between the main magnetic pole 103 and the gap material 110, the more the exchange interaction between the two regions 109-1 and 109-2 is weakened and the greater the part of the region 109-2 that is removed becomes, resulting in a greater disabling effect.

In order to prevent the region 109-2 from operating as an STO, a part of the region 109-2 may be removed such that conditions for preventing the STO function are satisfied. For example, when the high frequency magnetic field generation layer in the layer structure of the STO is removed, the STO does not oscillate and is disabled. The high frequency magnetic field generation layer occupies approximately one half of the STO layer structure. Thus, by removing approximately one half or more of the layers in the region 109-2, as shown in FIG. 5, the function of the region 109-2 as an STO can be sufficiently lost.

Figure 5:
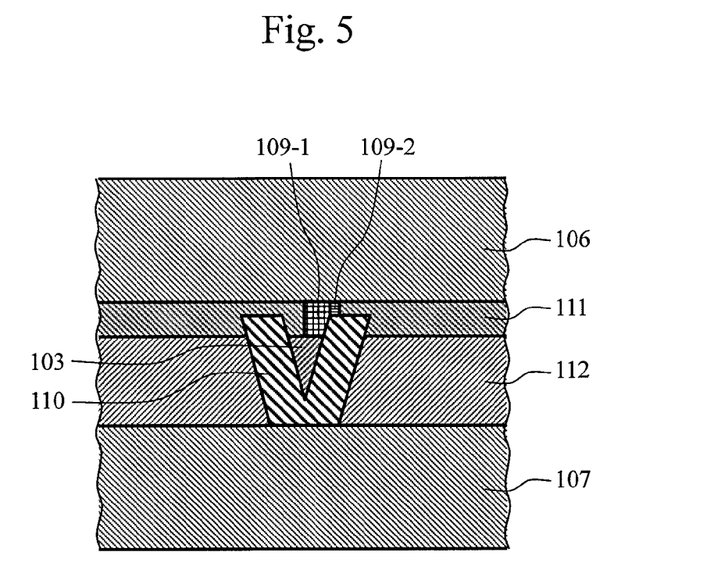
FIG. 5 is an enlarged schematic cross sectional view around the magnetic poles in the ABS of a high frequency magnetic field assisted magnetic recording head according to the present invention.
Figure 6:
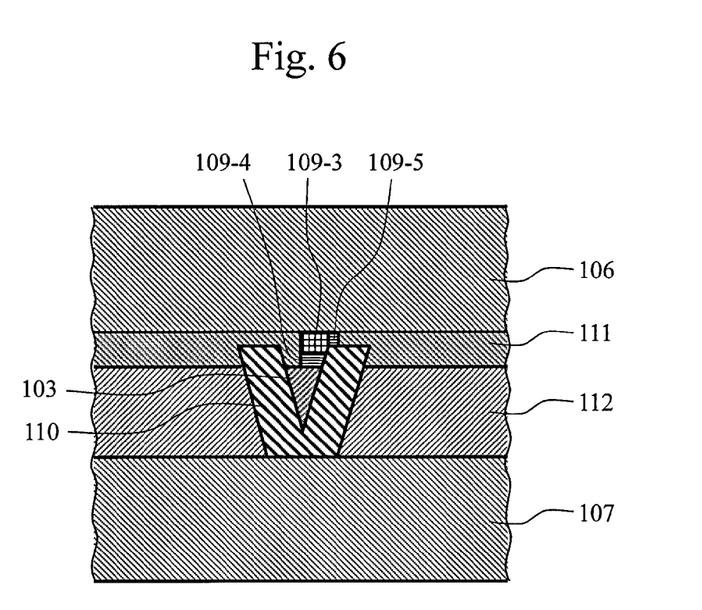
FIG. 6 is an enlarged schematic cross sectional view around the magnetic poles in the ABS of a high frequency magnetic field assisted magnetic recording head according to the present invention, illustrating a layer structure of the STO.

FIG. 6 is a schematic view clearly showing the removal of the high frequency magnetic field generation layer from the region 109-2 of the STO layer structure shown in FIG. 5. A region 109-3 includes a functioning high frequency magnetic field generation layer, and a region 109-4 includes layers of the STO layer structure other than the high frequency magnetic field generation layer. A region 109-5 is a part of the same layer structure of the region 109-4 and is formed on the side gap 110 forming the step. Thus, the region 109-5 is functionally separated from the region 109-4. Because the high frequency magnetic field generation layer on the region 109-5 is removed, the region 109-5 does not function as an STO.

Figure 7:
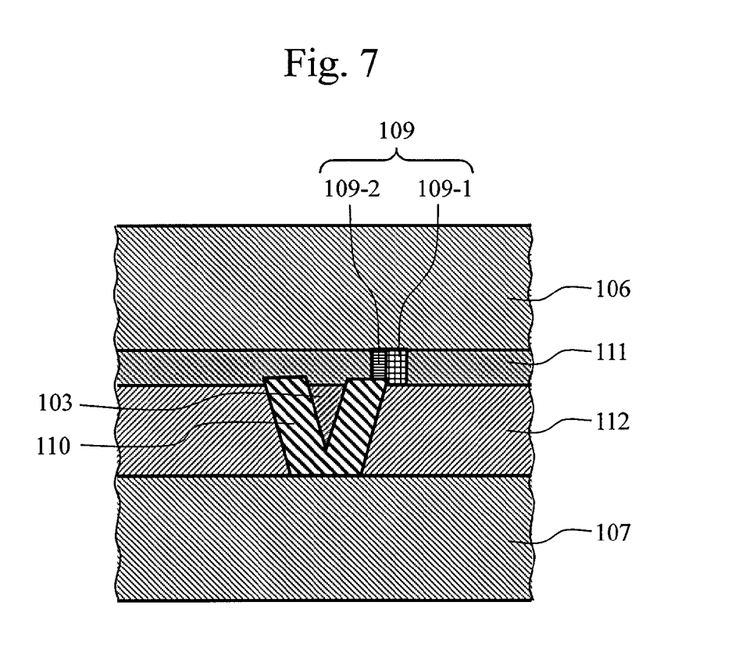
FIG. 7 is an enlarged schematic cross sectional view around the magnetic poles in the ABS of a high frequency magnetic field assisted magnetic recording head according to the present invention.

In the structure illustrated in FIG. 4, the STO 109 is formed on the step formed at the boundary between the main magnetic pole 103 and the gap material 110. However, when the main magnetic pole 103 and the STO 109 are intentionally formed with a certain distance between them in the cross-track direction, a similar self-alignment structure may be realized by using a step formed between the gap material and the side shield, as illustrated in FIG. 7.

FIGS. 8 to 15 are enlarged schematic cross sectional views on the air bearing surface (ABS), schematically illustrating a process of forming the structure shown in FIG. 4.

Figure 8:
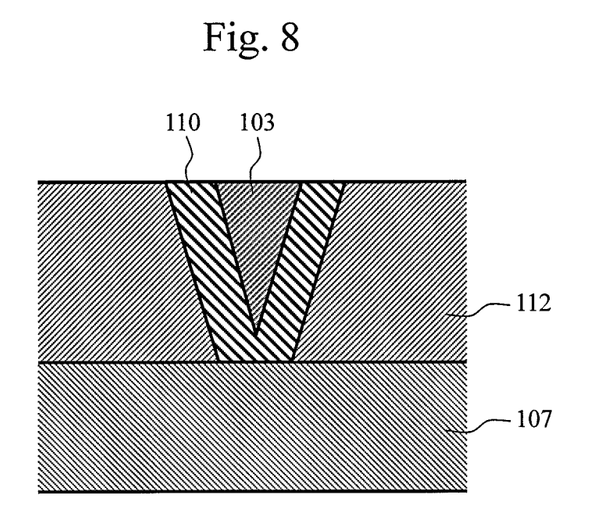
FIG. 8 is a schematic cross sectional view illustrating a step of forming a high frequency magnetic field assisted magnetic recording head according to the present invention.

FIG. 8 illustrates a state in which an original structure for the main magnetic pole is formed. The main magnetic pole 103 is formed inside the side gap material 110, on the outside of which the side shield 112 is formed. The side gap material 110 and the side shield 112 are formed on the leading-edge shield 107. The main magnetic pole 103 is made of a ferromagnetic material such as an FeCo alloy, and the side gap material is a non-magnetic material such as $Al_2O_3$ or Ru. The structure can be formed by a film forming process, such as sputtering or chemical vapor deposition, or by plating. At this point, the size of the main magnetic pole 110 is greater than the final size of the main magnetic pole, and is decreased to a practical size in the next step.

Figure 9:
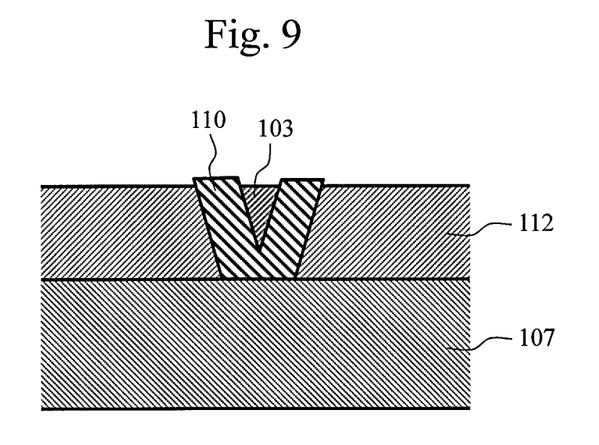
FIG. 9 is a schematic cross sectional view illustrating a step of forming the high frequency magnetic field assisted magnetic recording head according to the present invention.

FIG. 9 illustrates the step in which etch back is performed from above so as to obtain a predetermined size of the main magnetic pole from the state of FIG. 8. The etch back method may be ion milling or CMP. In the present case, however, in view of the purpose of intentionally forming steps at the boundaries between the main magnetic pole 103, the side gap material 110, and the side shield 112, it is preferable to use ion milling, which is suitable for forming a step by utilizing an etching rate difference depending on the material. In the illustrated example, ion milling was performed under an etching condition that the etching rate for the main magnetic pole 103 and the side shield 112 is greater than the etching rate for the side gap material 110. As a result, the surface of the side gap material 110 on the trailing side protrudes beyond the surfaces of the main magnetic pole 103 and the side shield 112 on the trailing side. Thus, steps are formed at the boundary portion between the main magnetic pole 103 and the side gap material 110 and at the boundary portion between the side gap material 110 and the side shield 112.

Figure 10:
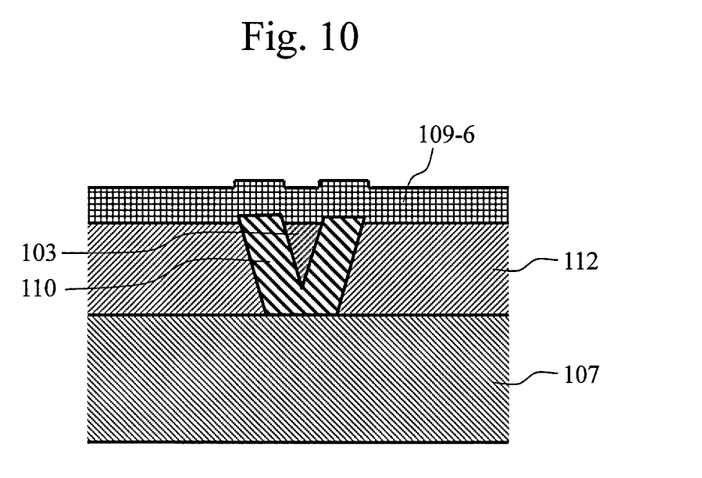
FIG. 10 is a schematic cross sectional view illustrating a step of forming the high frequency magnetic field assisted magnetic recording head according to the present invention.

FIG. 10 illustrates a step of forming an STO film 109-6 on the main magnetic pole 103, the side gap material 110, and the side shield 112 having the steps. The STO film 109-6, which is shown simplified in the figure, is in fact a multilayered film including a high frequency magnetic field generation layer, an intermediate layer, a spin injection layer, and the like.

Figure 11:
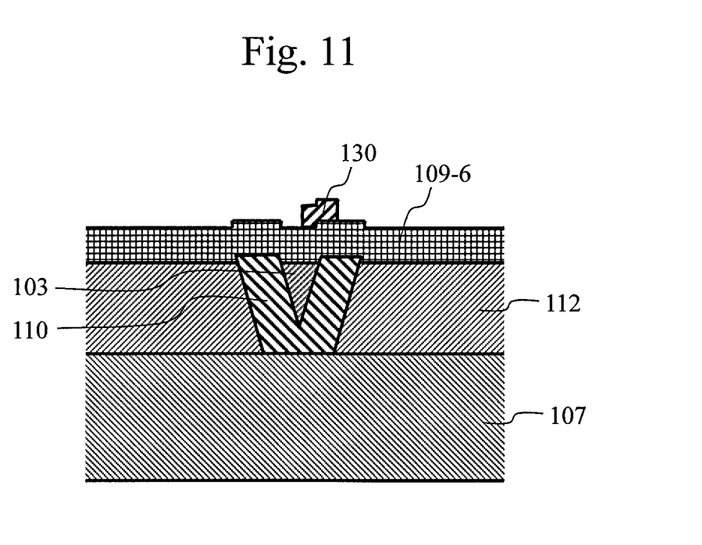
FIG. 11 is a schematic cross sectional view illustrating a step of forming the high frequency magnetic field assisted magnetic recording head according to the present invention.

FIG. 11 illustrates a step of forming an etching process mask 130 on the STO film 109-6 by photolithography so as to form an STO. The mask 130 is positioned to cover the step.

Figure 12:
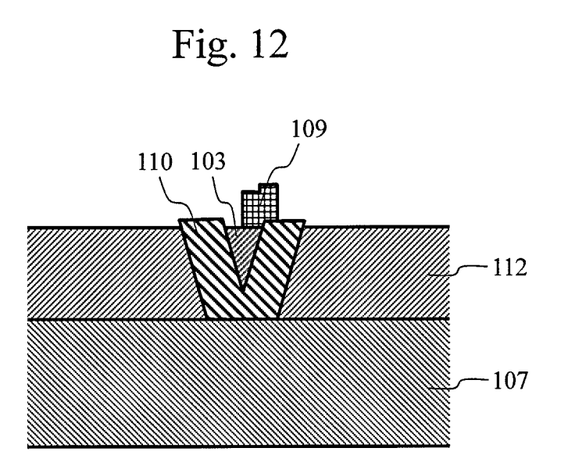
FIG. 12 is a schematic cross sectional view illustrating a step of forming the high frequency magnetic field assisted magnetic recording head according to the present invention.

Next, as illustrated in FIG. 12, the STO film 109-6 is etched by ion milling, for example. Thus, the STO 109 is formed on the step formed between the main magnetic pole 103 and the gap material 110. The upper surface of the STO 109 formed is not flat but has a step corresponding to the step on the lower surface of the STO.

Figure 13:
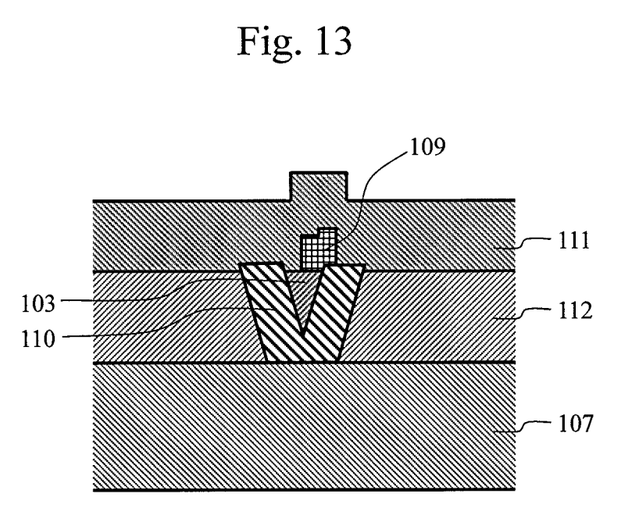
FIG. 13 is a schematic cross sectional view illustrating a step of forming the high frequency magnetic field assisted magnetic recording head according to the present invention.

Next, as illustrated in FIG. 13, the film 111 for the trailing gap is formed in such a manner as to sufficiently cover the STO 109. The trailing gap film 111 is composed of an insulator, such as an oxide, because of the need to electrically separate the main magnetic pole 103, which serves as a wire to supply electric power to the STO 109, from the trailing shield.

Figure 14:
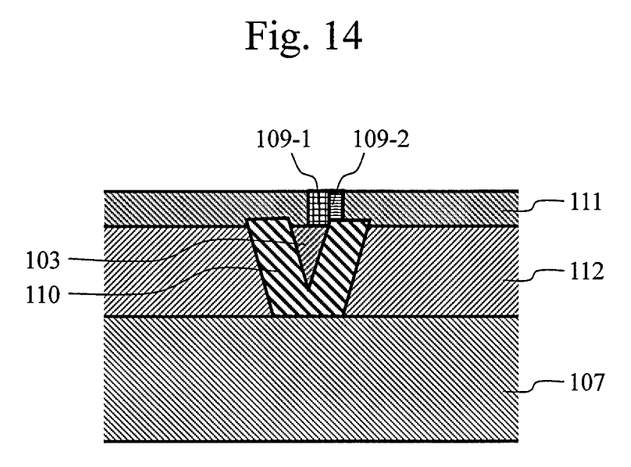
FIG. 14 is a schematic cross sectional view illustrating a step of forming the high frequency magnetic field assisted magnetic recording head according to the present invention.

Next, as illustrated in FIG. 14, planarization is performed by using an etch back process, such as CMP or ion milling. The planarization involves shaving until the upper surface of the region 109-1 over the main magnetic pole 103 that functions as an STO is just exposed. At this point, a part of the multilayer film of the region 109-2 is shaved from the upper surface thereof.

Figure 15:
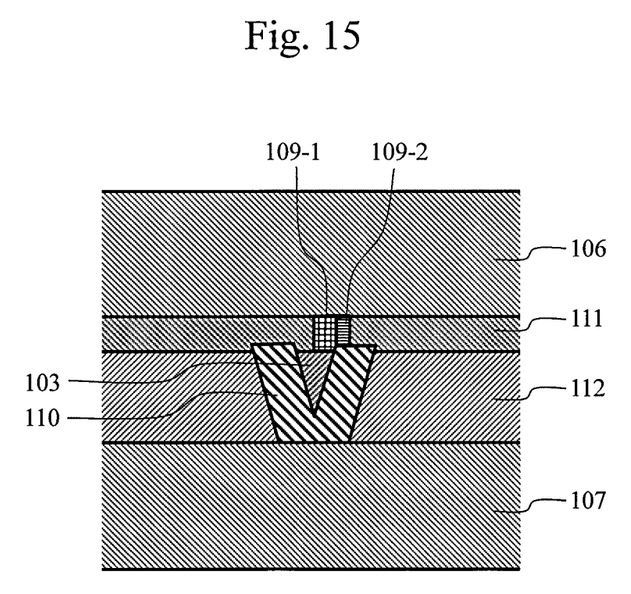
FIG. 15 is a schematic cross sectional view illustrating a step of forming the high frequency magnetic field assisted magnetic recording head according to the present invention.

Then, as illustrated in FIG. 15, the trailing shield 106 is formed on the planarized surface.

Figure 16:
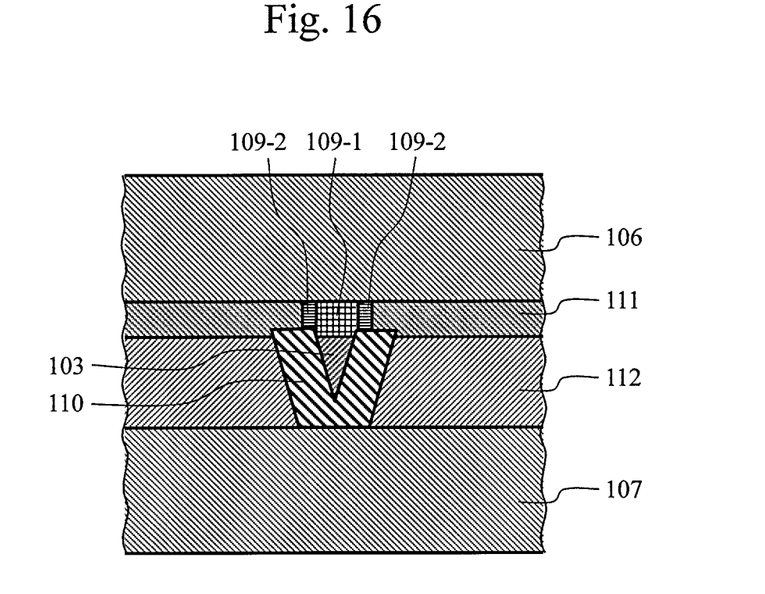
FIG. 16 is an enlarged schematic cross sectional view around the magnetic poles in the ABS of a high frequency magnetic field assisted magnetic recording head according to the present invention.

FIG. 16 is an enlarged schematic cross sectional view of the high frequency magnetic field assisted magnetic recording head according to another embodiment of the present invention on the air bearing surface (ABS). Steps exist between the main magnetic pole 103 and the gap material 110 on both left and right sides of the main magnetic pole. By using a process similar to the process of FIGS. 8 to 15, the STO is formed over the two steps and the regions 109-2 on the gap material 110 are disabled, whereby a self-alignment type high frequency magnetic field assisted recording head in which the region 109-1 functioning as an STO is aligned with the width of the main magnetic pole 103 can be manufactured.

Figure 17:
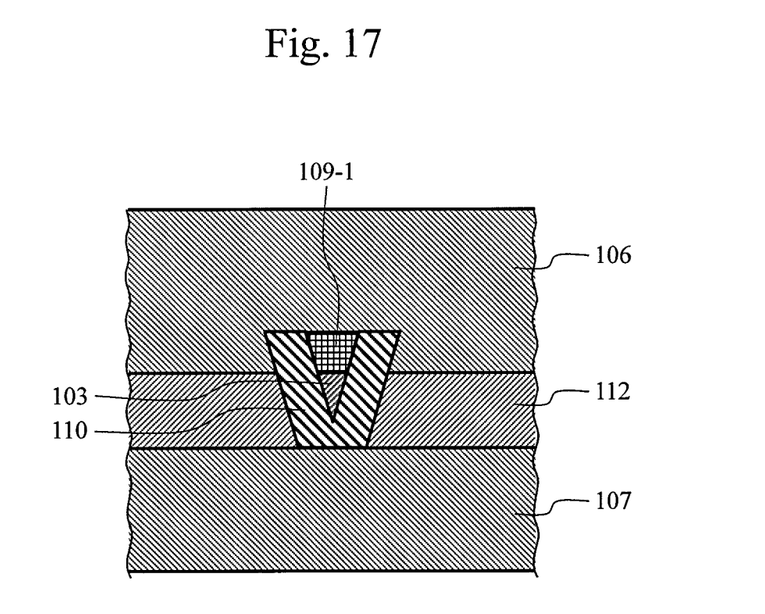
FIG. 17 is an enlarged schematic cross sectional view around the magnetic poles in the ABS of a high frequency magnetic field assisted magnetic recording head according to the present invention.

FIG. 17 is an enlarged schematic cross sectional view of the high frequency magnetic field assisted magnetic recording head according to another embodiment of the present invention on the air bearing surface (ABS). The structure can be realized by increasing the size of the steps formed between the main magnetic pole 103 and the gap material 110 compared with the embodiment shown in FIG. 16 and by completely removing the regions 109-2 formed on the gap material 110. As shown, the end surfaces of the gap material 110 disposed on both sides of the main magnetic pole 103 protrude beyond the end surface of the main magnetic pole 103 toward the trailing side. Thus, the main magnetic pole 103 and the gap material 110 have steps on the trailing side surfaces. In this structure, the trailing gap 111 is eliminated, so that the gap material 110 and the side shield 112 are in contact with the trailing shield 106. Thus, in order to supply electric power to the STO, an electric insulator may be used for the gap material 110.

The present invention is not limited to the foregoing embodiments and may include various modifications. For example, the foregoing embodiments have been set forth to aid the description of the present invention in an easily understandable manner, and the present invention is not necessarily limited to have all of the described configurations. A part of the configuration of a certain embodiment may be substituted with the configuration of another embodiment, or the configuration of the other embodiment may be added to the configuration of the certain embodiment. A part of the configuration of each embodiment may be modified by addition, deletion, or substitution with another configuration. For example, an electric wire may be used instead of the trailing shield.

REFERENCE SIGNS LIST

100 Slider
101 Air bearing surface (ABS) of the slider
103 Main magnetic pole
104 Auxiliary magnetic pole
105 Auxiliary magnetic pole
106 Trailing shield
107 Leading-edge shield
108 Magnetization coil
109 Spin torque oscillator (STO)
109-1 Region functioning as STO
109-2 STO-disabled region
109-3 Functioning high frequency magnetic field generation layer
109-4 Layers other than high frequency magnetic field generation layer
109-5 Layers other than high frequency magnetic field generation layer formed over side gap
109-6 STO film
110 Gap material
111 Trailing gap
112 Side shield
120 Read sensor element
130 Etching process mask
200 Magnetic recording medium substrate
201 Recording layer of magnetic recording medium
300 Recording field
301 High frequency magnetic field
400 Suspension
401 Gimbal

What is claimed is:

1. A high frequency magnetic field assisted magnetic recording head comprising:
    a main magnetic pole that generates a recording field; and
    a spin torque oscillator disposed in the vicinity of the main magnetic pole,
    wherein:
    a magnetic shield or a wire for supplying electric power to the spin torque oscillator is disposed in contact with a surface of the spin torque oscillator on the opposite side from a surface thereof on the main magnetic pole side;
    a step is formed at a boundary position between the main magnetic pole and a gap material disposed on both sides of the main magnetic pole in a direction perpendicular to a film stacked direction, and/or between the gap material and a side shield contacting the gap material in the perpendicular direction on trailing side surfaces thereof in at least an air bearing surface; and
    the spin torque oscillator is formed on the step in at least the air bearing surface.

2. The high frequency magnetic field assisted magnetic recording head according to claim 1, wherein a part of the spin torque oscillator is removed in a film thickness direction in a region on one side of the step at the boundary.

3. The high frequency magnetic field assisted magnetic recording head according to claim 1, wherein one half or more of the spin torque oscillator is removed in a film thickness direction in a region on one side of the step at the boundary.

4. The high frequency magnetic field assisted magnetic recording head according to claim 1, wherein:
    the spin torque oscillator has a stacked structure including a high frequency magnetic field generation layer and another layer; and
    the high frequency magnetic field generation layer is removed in a region on one side of the step at the boundary.

5. The high frequency magnetic field assisted magnetic recording head according to claim 1, wherein the spin torque oscillator has both a first width portion and a second width portion which extend from opposing sides of the spin torque oscillator in the perpendicular direction to a transition point of the step, respectively, and wherein the first width portion has a height extending in the film-stacked direction, which is higher than a height of the second width portion of the spin torque oscillator.

6. A high frequency magnetic field assisted magnetic recording head comprising:

a main magnetic pole that generates a recording field; and a spin torque oscillator disposed in the vicinity of the main magnetic pole, wherein:

the spin torque oscillator is disposed in contact with the main magnetic pole, with a magnetic shield or a wire for supplying electric power to the spin torque oscillator disposed in contact with a surface of the spin torque oscillator on the opposite side from a surface thereof contacting the main magnetic pole;

an end surface of a gap material disposed on both sides of the main magnetic pole protrudes beyond an end surface of the main magnetic pole toward a trailing side, forming a step between the main magnetic pole and the gap material in a direction perpendicular to a film-stacked direction, on trailing side surfaces thereof in at least an air bearing surface;

the spin torque oscillator is formed on the step and in contact with the inside of the gap material disposed on both sides of the main magnetic pole; and the gap material is composed of an electric insulator.

7. The high frequency magnetic field assisted magnetic recording head according to claim 6, wherein the spin torque oscillator has both a first width portion and a second width portion which extend from opposing sides of the spin torque oscillator in the perpendicular direction to a transition point of the step, respectively, and wherein the first width portion has a height extending in the film-stacked direction, which is higher than a height of the second width portion of the spin torque oscillator.

* * * * *